(12) United States Patent
Ozcan et al.

(10) Patent No.: US 10,966,006 B2
(45) Date of Patent: Mar. 30, 2021

(54) APPARATUS AND METHOD FOR A SOUND GENERATING DEVICE COMBINED WITH A DISPLAY UNIT

(75) Inventors: Koray Ozcan, Farnborough (GB); Timothy Mellow, Surrey (GB); John Samuels, Lancashire (GB)

(73) Assignee: Nokia Technologies Oy, Espoo (FI)

(*) Notice: Subject to any disclaimer, the term of this patent is extended or adjusted under 35 U.S.C. 154(b) by 290 days.

(21) Appl. No.: 13/995,709

(22) PCT Filed: Dec. 31, 2010

(86) PCT No.: PCT/IB2010/056150
§ 371 (c)(1),
(2), (4) Date: Jun. 19, 2013

(87) PCT Pub. No.: WO2012/090032
PCT Pub. Date: Jul. 5, 2012

(65) Prior Publication Data
US 2013/0272557 A1    Oct. 17, 2013

(51) Int. Cl.
| | | |
|---|---|---|
| *H04R 1/02* | (2006.01) | |
| *G06F 1/16* | (2006.01) | |
| *G06F 3/01* | (2006.01) | |
| *H04M 1/02* | (2006.01) | |
| *H04M 1/03* | (2006.01) | |

(52) U.S. Cl.
CPC .............. *H04R 1/02* (2013.01); *G06F 1/1637* (2013.01); *G06F 1/1688* (2013.01); *G06F 3/016* (2013.01); *H04M 1/0266* (2013.01); *H04M 1/03* (2013.01); *H04M 2250/22* (2013.01)

(58) Field of Classification Search
CPC ...... G06F 1/1637; G06F 1/1688; G06F 3/016; H04R 1/02; H04R 2499/15
See application file for complete search history.

(56) References Cited

U.S. PATENT DOCUMENTS 6,137,890 A * 10/2000 Markow ............... H04R 3/00
381/190
7,457,425 B2  11/2008 Fincham
(Continued)

FOREIGN PATENT DOCUMENTS

EP    1542064 A1    6/2005
EP    1655930 A1    5/2006
(Continued)

OTHER PUBLICATIONS https://forum.videolan.org/viewtopic.php?t=63184, Full screen opacity in windows?, Aug. 2009, The VideoLAN Forums.*
(Continued)

*Primary Examiner* — Mark Fischer
(74) *Attorney, Agent, or Firm* — Harrington & Smith

(57) ABSTRACT

In an embodiment an apparatus includes a display panel and a speaker module. The panel has a display layer for displaying images and defines a plurality of apertures penetrating through at least the display layer. The speaker module includes a diaphragm arranged substantially parallel to the display layer. Sound from the speaker diaphragm is directed outside a device through the apertures and the display layer is configured for displaying at least one virtual image in relation to generated sound waves wherein the display panel is acoustically transparent.

23 Claims, 7 Drawing Sheets

(56) References Cited

U.S. PATENT DOCUMENTS

| | | | |
|---|---|---|---|
| 7,909,466 B2 | 3/2011 | Fukui et al. | |
| 2002/0171636 A1* | 11/2002 | Aarts et al. | 345/177 |
| 2006/0010403 A1 | 1/2006 | Jeon | |
| 2006/0099996 A1* | 5/2006 | Kanai | H04M 1/03 455/566 |
| 2007/0223747 A1 | 9/2007 | Torisaki et al. | |
| 2008/0056507 A1* | 3/2008 | Logvinov | H04B 3/54 381/77 |
| 2008/0163119 A1* | 7/2008 | Kim | G06F 3/04886 715/840 |
| 2008/0165140 A1* | 7/2008 | Christie | G06F 3/04883 345/173 |
| 2009/0097691 A1* | 4/2009 | Eaton | 381/388 |
| 2010/0061040 A1* | 3/2010 | Dabov et al. | 361/679.01 |
| 2010/0092022 A1* | 4/2010 | Hopkinson et al. | 381/391 |
| 2010/0111336 A1* | 5/2010 | Jeong et al. | 381/306 |
| 2010/0124150 A1* | 5/2010 | Kablotsky | 367/138 |
| 2010/0141272 A1* | 6/2010 | Nurmi | G06F 3/045 324/654 |
| 2010/0204811 A1* | 8/2010 | Transeau | 700/94 |
| 2010/0246873 A1* | 9/2010 | Chen | H04R 5/02 381/333 |
| 2010/0265183 A1* | 10/2010 | Mail | G06F 3/04895 345/168 |
| 2011/0007915 A1* | 1/2011 | Park | H04N 5/607 381/306 |
| 2011/0103624 A1* | 5/2011 | Ferren | H04N 7/15 381/306 |
| 2011/0151938 A1* | 6/2011 | Hashimoto | H04M 1/0245 455/566 |
| 2011/0166690 A1* | 7/2011 | Ternus et al. | 700/117 |
| 2011/0248935 A1* | 10/2011 | Mellow et al. | 345/173 |
| 2011/0260997 A1* | 10/2011 | Ozaki | G06F 1/1618 345/173 |
| 2012/0126959 A1* | 5/2012 | Zarrabi et al. | 340/407.1 |
| 2012/0183162 A1* | 7/2012 | Chabanne | H04N 5/642 381/306 |
| 2012/0212420 A1* | 8/2012 | Shin | G06F 3/04883 345/173 |

FOREIGN PATENT DOCUMENTS

| | | | | |
|---|---|---|---|---|
| EP | 2268012 A2 | 12/2010 | | |
| JP | WO 2010026686 A1 * | 3/2010 | | H04M 1/0245 |
| WO | WO 2010054014 A1 * | 5/2010 | | G06F 3/01 |

OTHER PUBLICATIONS

International Search Report received for corresponding Patent Cooperation Treaty Application No. PCT/IB2010/056150, dated Jul. 27, 2011, 4 pages.

* cited by examiner

APPARATUS AND METHOD FOR A SOUND GENERATING DEVICE COMBINED WITH A DISPLAY UNIT

RELATED APPLICATION

This application was originally filed as PCT Application No. PCT/IB2010/056150 filed Dec. 31, 2010.

The present invention relates to an apparatus and method for a sound generating device combined with a display unit, such as may be present in but not only for a portable music device or wireless radio as well as larger consumer electronics devices such as televisions and desktop/laptop personal computers. The invention further relates to, but is not limited to, an apparatus for use with sound generating devices for arranging a virtual sound outlet based upon sound reproductions.

Sound generating devices such as mobile or cellular handsets or other portable devices such as gaming devices, personal computers or music players are known to include a suitable sound generating system comprising suitable software algorithms, electrical circuitries and mechanical arrangements. In case of a mobile handset, an integrated speaker module can for example reproduce a downlink or received audio signal or reproduce any compatible format audio signal. Some devices are known to include an earpiece speaker module for example to reproduce a downlink audio signal in a speech call when the device is located close to the user. Furthermore, it is known that some devices include a suitably designed integrated speaker module, for example a multi-function device, to function both as the earpiece speaker module and integrated speaker module. These modules are known as speaker modules for sound reproduction and their size and construction can vary.

In recent years, sound generating devices have been designed to assist different use cases such as music playback, ringtone playback, FM radio playback etc. In addition, such devices can comprise connectors for providing connectivity to external interfaces such as audio connectors and/or USB connectors. Using these external interfaces it is possible to arrange playback functionality. For example, an audio file can be played from the integrated speaker module and also using an external speaker system or a headset comprising one or more speaker modules.

The consumer products industry is driven, particularly for portable products like mobile phones, toward thinner designs and larger displays which enable more information to be viewed. Traditionally this has resulted in reducing loudspeaker size to enable a larger display. Size reduction of speaker modules has been however generally at the cost of performance, which in many current products is adequate only for speech. Furthermore further size reduction of speaker modules can be achieved with conventional speaker modules without sacrificing further audio performance.

Sound and audio generating device design typically comprises at least one sound outlet which is partially or substantially visible to the user. The sound outlet radiates the acoustic or sound waves to the exterior from the interior of the device. These sound outlets can be formed using one or more openings such as meshes and, grills.

The location of sound outlets can vary for integrated speaker modules however they are commonly arranged either on the side or on the back surfaces of the device. In some devices, the outlets are possibly located at the front surface of devices, for example an earpiece speaker module outlet is typically located on the front surface of the device. The physical locations of these sound outlets play a very important role for acoustic design but are influenced by other factors such as product shape, industrial and mechanical designs, production and tooling, as well as the location of other interfaces such as external audio connectors such as headphone jack, USB connector, memory card slot, and charging connector. It is understood that the locating of sound outlets is complex and problematic for current portable products.

There is provided according to a first aspect of the application an apparatus, comprising: a display configured to display images; and a speaker associated with the display configured to comprise at least one diaphragm configured to generate sound waves in the direction of the display wherein the display is configured to display at least one image dependent on the generated sound waves.

The speaker may comprise at least one first electrode and at least one second electrode; in which each of the at least one diaphragm may be disposed between an associated at least one first electrode and at least one second electrode, and wherein the at least one first electrode is a layer of the display.

The at least one image dependent on the generated sound waves may be an image to indicate positional information for the generated sound waves.

The at least one image dependent on the generated sound waves may be an image to represent a sound outlet for the generated sound waves.

The at least one image dependent on the generated sound waves may be an image to indicate a location of the speaker.

The display may comprise a display panel layer configured to display the at least one image.

The display panel layer may overlie the diaphragm and may be configured to be acoustically transparent so that sound waves in the direction of the display panel pass through the display panel.

The display panel may comprise at least one aperture.

The at least one aperture may comprise dimensions smaller than human acuity range.

The display panel layer may be integral with the diaphragm.

The apparatus may further comprise a touch sensor configured to detect inputs.

The apparatus may further comprise an audio controller configured to control at least one of: the speaker; and the at least one image dependent on the generated sound waves, based on the touch sensor input.

The speaker may comprise at least two segments, each segment configured to vibrate and generate sound waves independently of the other segments, wherein the audio controller may be configured to drive each segment dependent on the touch sensor input.

The audio controller may be configured to drive the segment closest to the touch sensor input position.

The audio controller may be configured to control each segment to generate sound waves which interact with one another to form an interference pattern to determine the directionality and/or loudness of the radiated sound.

The touch sensor may be integral with the display.

The display may comprise a haptic device configured to provide tactile feedback.

The display may comprise at least one of: an organic LED display; an inorganic LED; an electrochromic; an electrophoretic; a LCD display; and an electrowetting display.

The speaker may be a piezoelectric speaker.

The speaker may be selectable between a dipole mode and a monopole mode.

The diaphragm of the speaker may define an area approximately equal to an area defined by the display.

The speaker may comprise an array of diaphragms whose combined area is approximately equal to the area defined by the display.

The apparatus comprising the display and speaker associated with the display may be disposed within one of: a mobile electronic device; an automobile dash-mount display; a television; and a personal computer of the type desktop, laptop, palmtop or tablet.

The display panel may comprise a plurality of holes and the dimensions of the holes may be such that the holes are substantially invisible to the naked eye.

According to a second aspect there is provided a method, comprising: controlling a display configured to display images; and controlling a speaker associated with the display configured to comprise at least one diaphragm configured to generate sound waves in the direction of the display, wherein controlling the display comprises displaying at least one image dependent on the generated sound waves.

Displaying the at least one image dependent on the generated sound waves may comprise displaying at least one image to indicate positional information for the generated sound waves.

Displaying the at least one image dependent on the generated sound waves may comprise displaying at least one image to represent a sound outlet for the generated sound waves.

Displaying the at least one image dependent on the generated sound waves may comprise displaying at least one image to indicate a location of the speaker.

The method may further comprise determining an input to the display via a touch sensor configured to detect inputs.

The method may further comprise controlling at least one of: the speaker; and the at least one image dependent on the generated sound waves, based on the touch sensor input.

The method may further comprise: determining a sensor input; and controlling at least one of the display and speaker dependent on the sensor input.

According to a third aspect there is provided an apparatus, comprising: means for displaying images; and means for generating sound waves associated with the means for displaying images configured to comprise at least one diaphragm configured to generate sound waves in the direction of the means for displaying images wherein the means for displaying images is configured to display at least one image dependent on the generated sound waves.

The means for generating sound waves may comprise at least one first electrode and at least one second electrode; in which each of the at least one diaphragm may be disposed between an associated at least one first electrode and at least one second electrode, and wherein the at least one first electrode may be a layer of the means for displaying images.

The at least one image dependent on the generated sound waves may be an image to indicate positional information for the generated sound waves.

The at least one image dependent on the generated sound waves may be an image to represent a sound outlet for the generated sound waves.

The at least one image dependent on the generated sound waves may be an image to indicate a location of the means for generating sound waves.

The means for displaying images may comprise a display panel layer configured to display the at least one image.

The display panel layer may overlie the diaphragm and may be configured to be acoustically transparent so that sound waves in the direction of the display panel pass through the display panel.

The display panel may comprise at least one aperture.

The at least one aperture may have dimensions smaller than human acuity range.

The display panel layer may be integral with the diaphragm.

The apparatus may further comprise means for detecting touch inputs.

The apparatus may further comprise a control means for controlling at least one of: the means for generating sound waves; and the at least one image dependent on the generated sound waves, based on the means for detecting touch inputs.

The means for generating sound waves may comprise at least two segments, each segment configured to vibrate and generate sound waves independently of the other segments, wherein the control means may be configured to drive each segment dependent on the means for detecting touch inputs.

The control means may be configured to drive the segment closest to the means for detecting touch inputs input position.

The control means may be configured to control each segment to generate sound waves which interact with one another to form an interference pattern to determine the directionality and/or loudness of the radiated sound.

The means for detecting touch inputs may be integral with the means for displaying images.

The means for displaying images may comprise means for providing tactile feedback.

The means for displaying images may comprise at least one of: an organic LED display; an inorganic LED; an electrochromic; an electrophoretic; a LCD display; and an electrowetting display.

The means for generating sound waves may comprise a piezo-electric speaker.

The means for generating sound waves may be selectable between a dipole mode and a monopole mode.

The diaphragm of the means for generating sound waves may define an area approximately equal to an area defined by the means for displaying images.

The means for generating sound waves may comprise an array of diaphragms whose combined area is approximately equal to the area defined by the means for displaying images.

The apparatus comprising the means for displaying images and means for generating sound waves associated with the means for displaying images may be disposed within at least one of: a mobile electronic device; an automobile dash-mount display; a television; and a personal computer of the type desktop, laptop, palmtop or tablet.

The apparatus comprising the means for displaying images and means for generating sound waves associated with the means for displaying images, wherein the means for displaying images may comprise a plurality of holes and the dimensions of the holes are substantially invisible to the naked eye.

SUMMARY OF THE INVENTION

For better understanding of the present invention, reference will now be made by way of example to the accompanying drawings in which.

Figure 1:
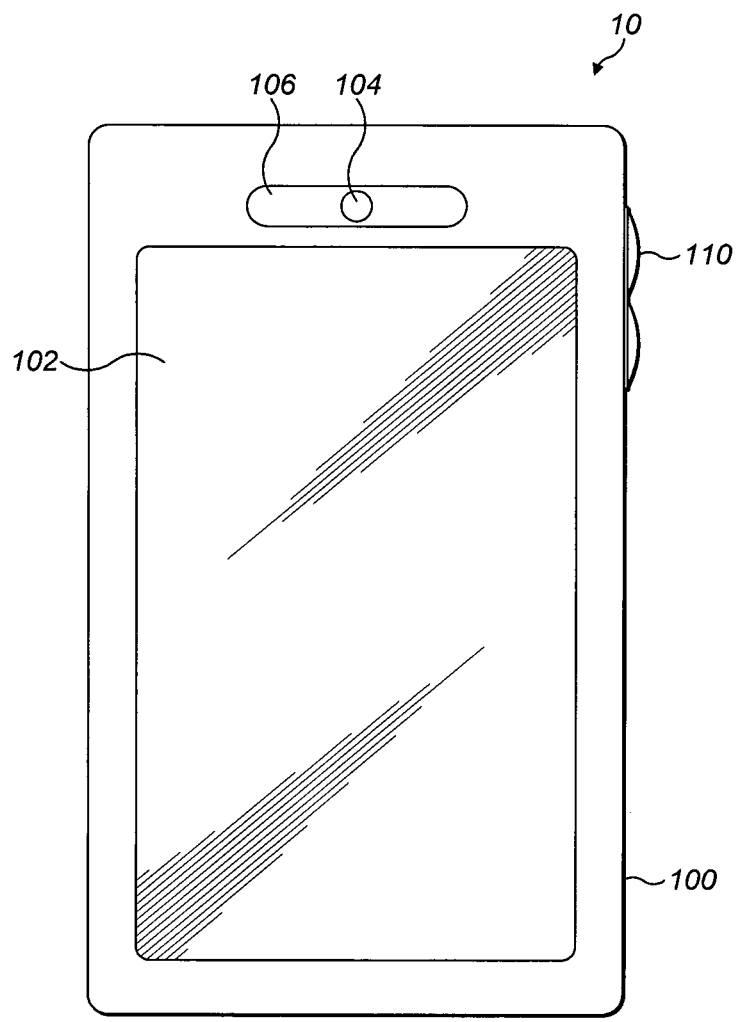
FIG. 1 shows schematically a typical electronic device or apparatus.

FIG. 1 is a plan view of a conventional or typical electronic apparatus suitable for operating as a mobile phone 10. The mobile phone 10 comprises an outer cover 100 which houses some internal components. The outer cover 100 may comprise a display region 102 through which a display panel is visible to a user. The outer cover also comprises a sound outlet 104. In this example the mobile phone 10 further comprises a recess feature 106 formed around the sound outlet 104. The visible feature 106 may in some embodiments include a separate bezel for the sound outlet 104 or in some other embodiments may be formed as part of the outer cover 100. When the sound outlet 104 is placed adjacent to a user's ear, sound generated by an earpiece speaker module is audible to the user. The mobile phone 10 also comprises a volume control button 110 with which the user can control the volume of an output of the earpiece speaker module (not shown).

Figure 2:
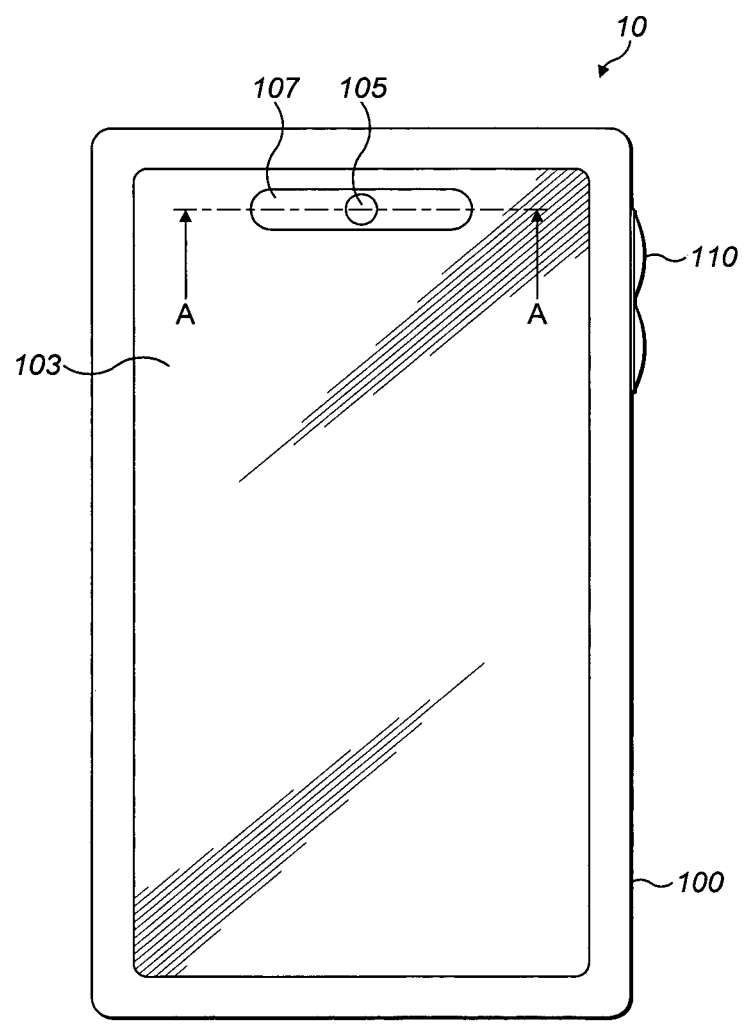
FIG. 2 shows schematically an electronic device apparatus employing embodiments of the invention.

The following describes in further detail suitable apparatus and possible mechanisms for the provision of 'virtual' or 'display' sound outlets. In this regard reference is first made to FIG. 2 which shows an exemplary apparatus or electronic device, which may incorporate virtual sound outlets according to some embodiments. The apparatus as shown in FIGS. 1 and 2 are user equipment in the form of a mobile phone. However it would be appreciated at embodiments of the application may be implemented with any devices providing sound reproduction.

FIG. 2 is a plan view of an apparatus suitable for operating as a mobile phone 10 according to some embodiments. The mobile phone 10 may in some embodiments comprise an outer cover 100 which houses some internal components. The outer cover may comprise a display region 103 through which a display panel is visible to a user. FIG. 2 shows that a larger display region can be implemented on embodiments of the application as the display region 103 can fill a greater proportion of the available cover surface area.

The outer cover 100 in some embodiments can comprise a graphical sound outlet 105. The graphical sound outlet 105 can in some embodiments be a display generated representation of a typical sound outlet. However it would be understood that in some embodiments the graphical sound outlet 105 can be any suitable shape, colour, and visible texture. In some embodiments the graphical sound outlet 105 can be selected by a user or selected by the operating system. Furthermore the graphical sound outlet in some embodiments can be generated by for example an application operating on the device.

In these embodiments the mobile phone 10 further comprises a virtual visible feature 107 formed around the virtual sound outlet 105. The virtual visible feature 107 may in some embodiments be a separate shape and configuration from the virtual sound outlet 105 and can in some embodiments be in the form of a virtual bezel for the virtual sound outlet 105. The virtual visible feature 107 can in some embodiments be a display generated representation of a typical sound surround. However it would be understood that in some embodiments the virtual visible feature 107 can be any suitable shape, colour, and visible texture. In some embodiments the virtual visible feature 107 can be selected by a user or selected by the operating system. Furthermore the virtual visible feature 107 in some embodiments can be generated by for example an application operating on the device.

When a call is received or user attempts to setup a call, the apparatus can be configured to generate an audio display instance which in some embodiments can cause the display to display a virtual sound outlet 105 at a location on the display 103 of a traditional sound outlet location. The user can then use the virtual sound outlet 105 position to orientate the device such that when the virtual sound outlet 105 is placed adjacent to a user's ear, sound or acoustic waves are audible to the user. In some further embodiments of the application, the virtual sound outlet 105 can be configured to be generated and displayed, in other words to become visible to the user, during typical communication operation modes of the mobile phone 10. In some further embodiments, the display can be configured to form a first display region part 103 suitable for displaying information to the user typical for a mobile device, for example contact information, call number, multimedia playback information and the virtual sound outlet 105 is displayed outside of this display region 103. In these embodiments, it is therefore understood that a larger display region can be provided without requiring the device to have a larger size by requiring an additional traditional sound outlet.

Figure 3A:
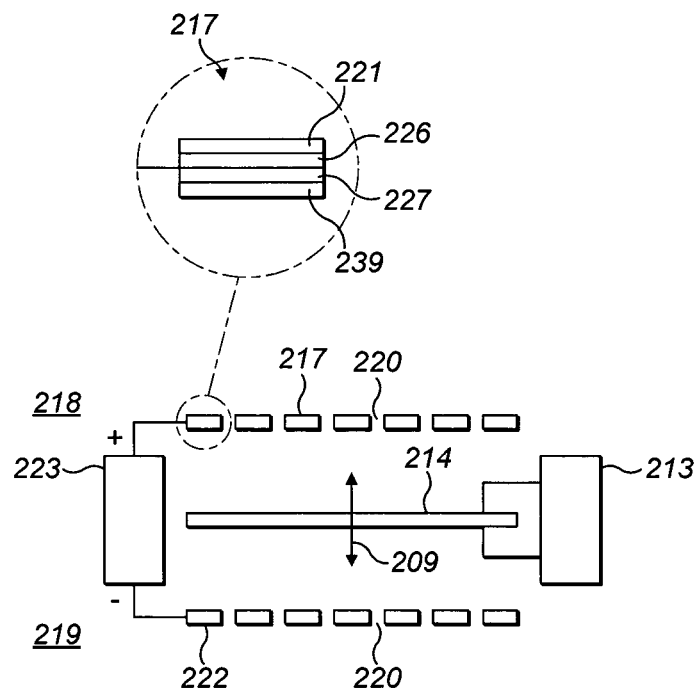
FIGS. 3a-3c show schematically a cross-sectional view of the apparatus shown in FIG. 2 at the dashed line denoted "A" according to some embodiments of the application.
Figure 3B:
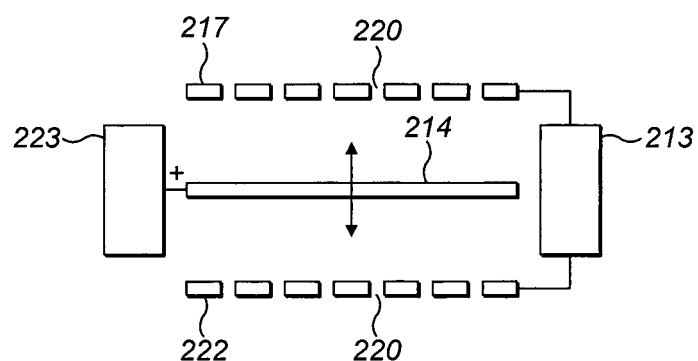
Figure 3C:
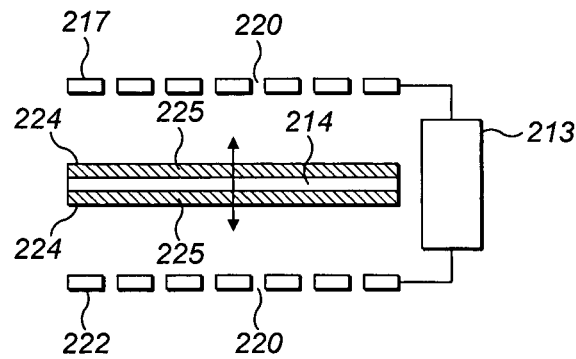

FIGS. 3a to 3c shows a series of example schematic cross-sectional views through the mobile phone 10 of FIG. 2 at the dashed line "A" according to some embodiments of the application.

According to FIG. 3a a first configuration is shown of the cross sectional view through the display region 213 region is shown. The display region 213 can in some embodiments comprise a display element 214. The display element (which in some embodiments can be known as the display face 214) can be configured to display visual content to the user positioned in 'front' of the apparatus. The display element 214 can be positioned 'behind' a stationary part 217. The display element 214 can in some embodiments be any suitable display technology, such as for example, liquid crystal display (LCD), organic LED (OLED) display, inorganic LED display, electrochromic display, electrophoretic display, or electrowetting display.

The display region furthermore comprises a display stationary part 217. The display stationary part can in some embodiments be a cover screen configured to protect the display element 214 from physical damage. For example the stationary part 217 can be configured to protect the electronic display 214 from direct touch or other external forces.

For simplicity the display element 214 is shown as a single layer, however it would be understood that in some embodiments the display element could be more than one layer, furthermore in some embodiments there may be additional components (not shown) between the display element 214 and the stationary part 217 (for example additional layers of material).

The display element 214 in some embodiments can be configured to operate as a speaker diaphragm and vibrate with respect to the stationary part 217. The vibration of the display element 214 can therefore displace air adjacent to the plane of the display element 214 resulting in the generation of sound waves in front of 218 and behind 219 the display element 214. To allow a user to hear the sound waves, the stationary part 217 is configured in such embodiments to be substantially acoustically transparent. Furthermore, to enable the user to view the visual content shown on the display element 214, the stationary part 217 can in some embodiments be configured to be substantially optically transparent. The stationary part 217, being stationary, configured not to vibrate furthermore in some embodiments can reduce the problem of changing light reflections on the display element where reflections from the display element 214 when vibrating can distract the user and have a negative influence on the quality of the displayed image.

The stationary part 217 can in some embodiments comprise lattice structure. In other words the stationary part 217 can be configured to comprise at least one aperture or hole 220. The dimensions of each aperture 220 can in such embodiments be designed such that each aperture 220 is substantially invisible to the naked eye. The dimensions of each apertures 220 can in some embodiments be chosen to minimise accumulation within each aperture 220 of contaminants such as for example dirt, skin, dust, moisture or oil. This minimisation of contaminant design using suitably sized aperture furthermore is important where the apparatus comprises part of a portable electronic device, such as a portable telecommunications device. Such devices are usually handheld and therefore in direct contact with the user's skin, which increases the transfer of the above-mentioned particles and fluids. A suitable dimension for each aperture would be an aperture diameter less than 0.05 mm so that they are difficult to see or cannot be seen by the user (and therefore do not detract from the visual content of the display element 214), and do not get contaminated and therefore sealed by particles or fluids. This would be understood to be smaller than the pixel diameter of most modern displays. To further reduce the accumulation of foreign particles and fluids within the aperture 220 in some embodiments the stationary part 217 can comprise a coating 221 to help repel particles and fluids. In some embodiments the coating 221 can be a self-cleaning coating.

The coating 221 in some embodiments can be at least one of a hydrophobic coating, oleophilic coating, and a scratch resistant coating. For example, the coating 221 can in some embodiments comprise a self-cleaning coating for a glass layer which is configured to prevent the build up of dirt through photocatalytic decomposition. The self-cleaning coating can in some embodiments comprise glass containing titanium dioxide. Examples of commercially available self-cleaning glass (which may be suitable for use with the present apparatus) include: Pilkington Activ™ by Pilkington, SunClean™ by PPG Industries, Neat Glass™ by Cardinal Glass Industries, SGG Aquaclean™ by Saint-Gobain, and Bioclean™ by Saint-Gobain. Another example of a commercially available coating which may be suitable for use with the present apparatus is DFI™ by Diamond Fusion International, Inc.

The aperture 220 dimension furthermore could in some embodiments be chosen or designed to enable a tuning of the acoustic resistance of the stationary part 217. In some embodiments a suitable selection or design using a determined number of apertures 220, and with determined aperture 220 dimensions, it is possible to control the vibration modes of the display element 214.

The display element 214 can in some embodiments be moved or vibrated using any suitable actuator. For example in some embodiments the display element 214 can be considered to be a diaphragm element in an electrodynamic setup such as used by conventional loudspeakers. In some embodiments one or more actuator may be used to vibrate the display 214. The actuator used to move the display element can be any suitable actuator technology such as pneumatic, hydraulic, electric, magnetic or piezoelectric. Furthermore in some embodiments the actuator can be configured to convert an electrical signal into a linear motion of the display element and so enable an audio driver 213 to receive an audio signal and drive the display element 214. In some embodiments the actuator is part of the display element. For example the display element 214 can be a flexible display and generate bending waves using one or more exciters, in a manner similar to a distributed mode loudspeaker.

In some embodiments as described herein the display element can be actuated to be both display and acoustic transducer. In some embodiments furthermore the touch layer can be implemented over and integral with the display embodiments. The display and acoustic transducer can in some embodiments not be confined at least partially externally by a static layer—in other words the display and acoustic transducer layer can be located externally of the apparatus. In such embodiments the integrated display and acoustic transducer layer can as described herein be configured to form the virtual visible feature or virtual sound outlet, such as an image of a conventional mobile phone earpiece or a conventional speaker. These images can be used to assist the user in determining the correct manner to hold the apparatus.

It would be understood that in some embodiments the integrated display and acoustic transducer layer can further incorporate a touch interface layer configured to enable inputs to the device which can be interoperated and used to control parameters associated with the displayed image and/or the acoustical properties of the integrated display and acoustic transducer layer.

In some embodiments the virtual visible feature or virtual sound outlet image can be configured to be a static image whereas in some embodiments the image may be a dynamic image. Thus in some embodiments the image can be in a hands free mode of operation one of a speaker cone which moves dependent on a characteristic of the acoustic transducer output, for example the amplitude or power signal level of the audio signal being output.

In some embodiments, such as shown in FIG. 3a electrostatic charge can be configured to induce vibrations in the display element 214 and thus generate the acoustic waves. The use of electrostatic charge vibration generation is that the number of moving parts in the speaker can be reduced.

As with all speaker modules, the sound waves generated by the display element can cause mechanical vibration of all objects the sound or acoustic waves interact with. This can include all parts of the speaker module and any electronic components. By reducing the number of moving parts the audio degradation caused when the amplitude of these vibrations is sufficient can be reduced, resulting in a more faithful reproduction of the recorded signal.

In some embodiments the apparatus further comprises a second stationary part 222 positioned 'behind' the display element 214. As shown in FIGS. 3a-3c, in some embodiment there can be additional components located between the display 214 and the second stationary part 222 (for example additional layers of material). The second stationary part 222 can in some embodiments, like the stationary part 217 in front of the display element 214, be substantially acoustically transparent and configured such that the sound waves generated 'behind' or at the rear 219 of the vibrating display element 214 can radiate through the second stationary part 222.

In some embodiments, and unlike the stationary part 217, the second stationary part 222 is optically opaque or solid as the second stationary part 222 is not used for display purposes. The second stationary part 222 can furthermore comprise at least one aperture 220. The dimensions and/or number of apertures 220 furthermore can be determined by the acoustic qualities only and need not be dictated by the same optical requirements that affect the apertures 220 of the stationary part 217.

As described herein the display element can be configured to be actuated by electrostatic charges causing vibration of the display element 214. In some embodiments to generate the electrostatic charges, the stationary part 217, the second stationary part 222, and the display element 214 are electrically charged. Each of the stationary part 217 and the second stationary part 222 can in some embodiments comprise an electrically conducting layer 239. The two stationary parts are furthermore configured to have electrically conducting layers which are oppositely charged (i.e. have opposite polarities), and are configured to attract or repel the display 214 based on their respective polarities (and/or the magnitude) of their charges.

In a first example as shown in FIG. 3a, an audio driver 213 can based on an audio signal control a flow of current through the display element 214. The audio driver 213 can therefore cause changes in the polarity or/and the magnitude of electrical charge in the display element 214. In such embodiments the polarity or/and the magnitude of charge stored in the stationary part 217 and second stationary part 222 is kept constant. In this manner, as the polarity (and/or magnitude) of the charge stored in the display element 214 varies, the forces applied on the display element 214 vary such that the display element is pulled/repulsed (as indicated by the arrows 209) between the stationary part 217 and second stationary part 222, generating sound or acoustic waves as it moves.

In some embodiments the apparatus further comprises a charge driver or polarizing supply 223 which comprises a power supply which can be used to charge the stationary part 217. In some embodiments the audio driver 213 can comprise a second polarising supply configured to vary the charge applied to the display element 214 dependent on an input audio source signal.

In a second example of some embodiments, as shown in FIG. 3b, the polarity or/and the magnitude of charge of the display element 214 is held constant whilst the polarity or/and the magnitude of charge of the stationary part 217 and the second stationary part 222 are varied dependent on an audio signal. In such embodiments an audio driver 213 can be configured to vary the charge on the stationary part 217, and the additional stationary part 222 and a charge driver or polarizing supply 223 configured to maintain a charge on the display element 214.

In some embodiments maintaining the polarity or/and the magnitude of charge of the display element 214 can be performed by the display element comprising electret materials. As shown in FIG. 3c the display element 214 comprises at least one electrets layer. An electret is a dielectric material that has a semi-permanent electric charge or dipole polarisation. An electret thus generates internal and external electric fields and may be considered to be the electrostatic equivalent of a permanent magnet.

There are known two types of electrets: real charge electrets and oriented dipole electrets. Real charge electrets contain excess charge of one or both polarities either on the dielectric's surfaces (i.e. surface charges), or within the dielectric's volume (i.e. volume charges). Oriented dipole electrets contain an alignment of electric dipoles. Ferroelectric materials are examples of oriented dipole electrets.

As shown in FIG. 3c, the display element 214 can comprise two porous electret membranes 224, one located on either side of the display element 214, to store electrical charge. Each electret membrane 224 can in some embodiments comprise an optically transparent conductive coating 225, such as for example indium oxide, on the face adjacent to the display 214. For low distortion operation, the display 214 should have a constant charge on its surfaces. The conductive coatings 225 of the electret membranes 224, which are in physical contact with the display 214 can in such embodiments assist in achieving a constant or relatively uniform charge density by increasing the surface resistivity of the display 214.

Where in embodiments the electrets layers 224 have the same polarity, the display can be driven by varying the polarity or/and the magnitude of charge of the stationary part 217 and the second stationary part 222. The use of an electret display element 214 operating as a loudspeaker has in some embodiments the advantage of being highly efficient, exhibiting low distortion, and providing a flat frequency response. In addition, the absence of a magnet reduces the volume required for the loudspeaker and assists in reducing or eliminating other issues such as disturbing RF circuitry or erasing information stored in magnetic storage media.

Although electret speakers require high drive voltages in order to vibrate the display element 214, the current and power required to operate the 'speaker' is extremely small (less than 40 pF mainly capacitive load). In some embodiments in order to reduce the possibility of electric discharge, a high value series resistor could be included.

In some embodiments the stationary part 217 (and in some embodiments the second stationary part 222) can comprise touch screen technology configured to allow a user to interact directly with content shown on the display element 214 by touching the stationary part 217 'above' the display element 214. In some embodiments the stationary part can comprise at least one touch sensitive element 226 such as for example the touch sensitive element layer 226 of the stationary part 217 seen in the enlarged view section of FIG. 3a.

In some embodiments the stationary part 217 and furthermore in some further embodiments the additional stationary part 222 can comprise haptic technology configured to provide tactile feedback to a user when the user touches the stationary part 217 (or the second stationary part 222). The haptic technology can in some embodiments employ for example one or more of pneumatic stimulation, vibro-tactile stimulation, electrotactile stimulation, and functional neuromuscular stimulation. Thus for example in some embodiments the stationary part 217 can comprise a haptic element 227 as seen in the enlarged view of FIG. 3a.

In some embodiments where both the stationary part 217 and the second stationary part 222 are acoustically transparent, sound or acoustic waves are able to radiate in both the 'front' 218 and 'rear' 219 directions. As a result of this symmetry, the display element 214 'speaker' is configured to produce a dipole radiation pattern. The term dipole derives from the fact that the radiation pattern consists of two lobes, with equal sound radiated towards the 'front' 218 and 'rear' 219 of the display element 214, and no sound radiated towards the sides of the display (i.e. in a plane perpendicular to the direction of motion of the display element 214). Furthermore the sound waves generated at the 'front' 218 of the electronic display element 214 are 180° out of phase with the sound waves generated at the 'rear' 219 of the electronic display element 214.

The dipole radiation pattern generated by embodiments of the application can be used to improve audio privacy of a device operating the embodiments of the application as little or no sound is transmitted laterally. This can thus be advantageous to users wishing to discuss sensitive or personal matters whilst operating the device in an integrated 'handsfree' mode of operation. In such embodiments the device is configured so that there are no components other than those discussed herein positioned 'behind' the electronic display element 214, such as mobile phone displays with communicator or flip form factors, laptop and desktop computer displays, and televisions, where sound can exit freely from both the front 218 and rear 219 of the display 214 without scattering.

Whilst embodiments in which the electronic display element 214 vibrates have been described, the skilled person will appreciate that there could be embodiments (not described) in which not all, or determined parts only of the electronic display vibrate. For example in some embodiments only the display face of the electronic display element 214 is configured to vibrate.

In some embodiments the second stationary part 222 can comprise an enclosure (not shown). The enclosure is configured in such embodiments to prevent sound waves generated at the 'rear' 219 of or behind the display element 214 from interacting with sound waves generated at the 'front' 218 or in front of the display element 214. In these embodiments, the sound generated at the rear 219 of the display element 214 exits into the enclosure producing a monopole radiation pattern. The sound waves in such embodiments are scattered by the enclosure 228 and are radiated from the front 218 of the display element 214. Although in some embodiments a conventional speaker module enclosure can be used to achieve this, they are typically large in size (especially in depth) which inhibits miniaturisation and is therefore undesirable. In some embodiments the enclosure can be formed using materials such as activated carbon or other air-absorbing materials to enable a smaller enclosure volume and therefore operation within a 'thin' device.

In some embodiments, the apparatus can selectively produce both a dipole and a monopole radiation pattern. This selective radiation pattern variation enables the user to select the dipole pattern when requiring greater audio privacy (where no sound is radiated towards the sides of the display), and select the monopole pattern when desiring greater audio dispersion (where the sound is radiated 'omnidirectionally').

In some embodiments the display element 214 can be segmented into parts so to allow the directionality of the audio output to be 'steerable'. In such embodiments the user by selecting which segment of the display element 214 to produce the acoustic output can therefore control the acoustic output. In some embodiments each segment or part of the display element 214 can be configured to vibrate and generate sound waves independently of other segments. In some embodiments this independence of operation can be achieved by driving the vibration of each segment using separate actuators. For example in electrostatically controlled actuation using the stationary part 217 and second stationary part 222, the stationary part 217 and second stationary part 222 can be partitioned into associated sections, each section configured to attract or repel a corresponding or associated segment of the electronic display element 214. In some embodiments the partitioned segments are driven by respective bridge amplifiers controlling magnitude and phase responses of each segment. In some other embodiments the bridge amplifiers can generate anti-phase outputs. In such embodiments an input electric signal can be amplified by a first bridge amplifier and applied to a centre electrode pair of the display area, and each successive bridge amplifier is coupled to an output of a phase delay element of a plurality of serially connected phase delay elements such that the input electrical signal is successively propagated and delayed from the centre electrode pair towards electrode pairs disposed at a periphery of other electrode pairs located at the edge of the display 214.

In some embodiments the apparatus can determine which section of the display 214 generates the sound waves. In such embodiments the user can provide an input to the apparatus indicating a display element 214 or alternatively selecting a portion of the display element 214.

Figure 3D:
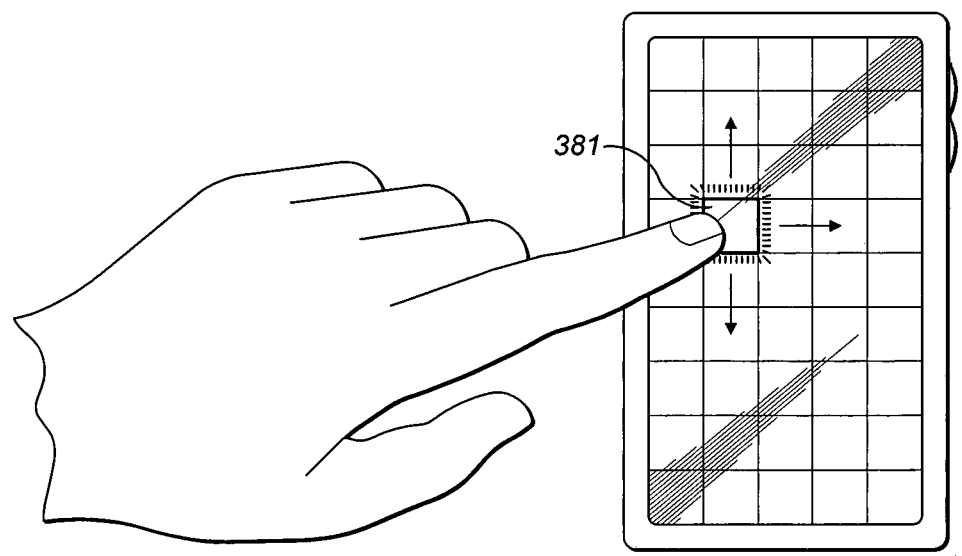
FIG. 3d shows schematically an apparatus in accordance with the exemplary embodiments.

For example FIG. 3*d* shows an apparatus whereby the display element 214 comprises a grid of display element 214 segments. In such embodiments the operation of the display element 214 segments can be controlled by the touch input of the user. For example by touching or selecting a point or section of the stationary part 217 'above' a segment of the display element 214 the associated display element 214 selected can be the 'centre' point of the sound generation, or the only segment generating sound. In some embodiments the display element 214 can generate any suitable image The image generated by the display element can in some embodiments therefore be a virtual sound outlet or an image of a speaker module or any other visual indication showing such activation of the effective display area wherein the sound is reproduced.

The image forming the virtual sound outlet(s) can be provided as described herein by a program running on a processor or storage device or by an application programme associated with the system. The images can in some embodiment be overlaid with a grid. The images can take a number of forms. For example the displayed image can comprise a solid line or dashed/dotted line overlay, providing outlines of each active section of the display 214. In some example embodiments, the overlay can be faint or variable. In some embodiments the display element 214 can provide a colour difference to the pixels of the overlay to indicate the location of where the sound is reproduced. In some embodiments the overlay can be configured to be displayed for only a period of time whilst the user is selecting a location. In other words the overlay, which may be a grid, disappears after a short time period as soon as the selection is made. In some embodiments the overlay can be turned off by the user.

In some embodiments the selected sections of segments of the display element 214 can be active without displaying images indicating their activity, in other words being visible.

In accordance with the embodiments of the invention, software based variable pixel controls can be provided to determine and control which pixels of the display can be used for displaying the virtual sound outlets, the active sections or segments of the display element 214 for sound reproduction and which pixels are used for displaying the main image used by the device or for the background.

The operations of merging the image of the virtual sound outlet with the normal output image on the display according to the invention can occur by a variety of methods and programming schemes. In some embodiment the apparatus can determine when the user drags a finger along the stationary part 217 to selectively move the active sound reproduction to the associated segment 'under' the desired location. Furthermore in some embodiments the apparatus can determine when the user can decide to receive a less localised sound image by either selecting a larger display section or vice versa. Furthermore in some embodiments the apparatus is configured to determine any movement of the user's finger (or other input device) along the stationary part 217. In such embodiments the determination of movement can be used in a manner similar to the input provided by the movement of the mouse or other pointing device.

In some embodiments the audio characteristics of the display element 214 or segments of the display element 214 can be controlled dependent on the determination of inputs provided on the stationary part 217 over the display element 214 or segment of display element 214. Thus in some embodiments the apparatus can determine a contact of one, two, three or more of a user's fingers and furthermore dependent on the determination control the activation of an appropriate number of display element sections or segments to control the sound reproduction. According to one example embodiment, each determined contacts can be configured to control a reduction of or increase of the number of sections of the display element 214 being operated for sound reproduction.

Figure 6:
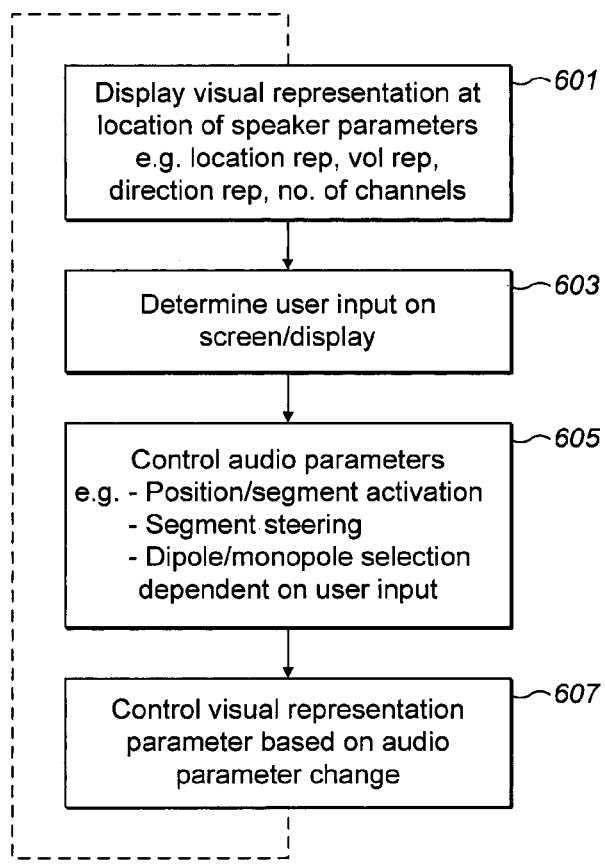
FIG. 6 shows a flow diagram showing the control of at least one characteristic of the audio or speaker module in accordance with the exemplary embodiments.

As shown with respect to FIG. 6, a flow diagram showing the control of at least one characteristic of the audio or speaker module represented on the display over the speaker module is shown.

In some embodiments the apparatus, or processor in the apparatus, can be configured to control the display element 214 to display a visual representation of at least one parameter representing the speaker. For example in some embodiments and as described herein a representation of a 'virtual' speaker hole and bezel can be displayed over the location of the segments of the display element 214 configured to generate the audio signal. In some other embodiments any other suitable displayable parameter associated with the sound being generated can be displayed, such as a representation of the volume of the speaker, a representation of the direction of the sound, and a representation of the number of speaker channels being output.

The operation of displaying at least one visual representation of the speaker parameters is shown in FIG. 6 by step 601.

Furthermore in such embodiments the display element 214, or touch interface layer overlying the display element 214 can be configured to determine any user interfacing with the apparatus. Furthermore in some embodiments a touch screen processor can be configured to receive the input information and determine user input instructions which can be passed to associated audio and/or display control processors to carry out the user input requests.

The operation of determining the user input is shown in FIG. 6 by step 603.

In some embodiments an audio processor on receiving instructions from a touch screen processor can control any suitable audio parameter associated with the display element 214 or display audio generation. For example the user could indicate on the screen that the position of the audio source is to be moved from one position to another position, to be widened, to be more localised, to be directed in a specific direction or otherwise. For example the user could move their finger across the screen indicating an audio source location motion which is detected by the display element and the touch screen processor which activates new segments or parts of the display element 214 and deactivates the previously activated display element segments to 'move' the source of the audio signal from one location to the new desired location. Similarly any suitable parameter can be controlled such as volume/power level, the number of audio channels, steering/beamforming the audio signal, switching between monopole and dipole speaker configurations.

The operation of controlling the audio parameters is shown in FIG. 6 by step 605.

Furthermore in some embodiments a display processor on also receiving instructions from the touch screen processor can control the visual representation to reflect the changed in any associated audio parameter. Thus for example the change of location of the audio source, where the display element 214 or speaker segment is changed can be reflected by a change in the location of the associated speaker parameter, for example by displaying the visual representation of the audio or speaker hole at the new speaker location.

The operation of controlling the visual representation parameter based on the audio parameter change is shown in FIG. 6 by step 607.

It would be appreciated that in some embodiments this operation is a looped operation in that the touch screen is monitored and control of audio and visual representations occurs at intervals which provide for the user an almost seamless experience.

It would be appreciated that in some embodiments the audio and visual representations can be controlled based on inputs other than the user or touch screen inputs. For example in some embodiments the control of the audio and visual representations is based on sensor information. For example some apparatus can comprise a sensor which determines the angle the apparatus is currently being held at and orientates the 'speaker' and the visual representation of the speaker at the 'upper' part of the apparatus—the location typically placed closest to the ear.

In accordance with the embodiments of the invention, the system or apparatus can comprise at least two partitions or segments. In these multi-segment or partition display element 214 embodiments there can comprise a multi-channel controller configured to provide a multichannel playback where the sound 'origin' positions can be changed or determined by the user. For example, the system can comprise a stereo or two channel playback device whereby a first partition or segment of the display element 214 is configured to playback a first channel audio signal and a second partition or segment of the display element 214 is configured to playback a second channel audio signal.

It would be appreciated that any suitable number of partitions or segments can be implemented. The apparatus in some embodiments can comprise suitably designed a digital signal processor (DSP) or controller, and further be configured to perform suitable DSP algorithms such as filters configured to modify the input signals for each partition. In some embodiments the digital signal processor can be configured to output to each partition or segment of the display element 214 a signal which enables the sound waves generated by the different sections or segments of the display element 214 can be configured to interact with one another to form an interference pattern. Alternatively in some embodiment the sections can be configured so that the audio output from each is independently provided. In some embodiments the digital signal processor can control at least two segments of the display element 214 such that a technique known as beam-forming can be used to increase the directionality of the radiated sound by causing the sound waves to destructively and/or constructively interfere. For example in some embodiments the digital signal processor and the display element 214 segments generate acoustic waves with destructively interfere at the sides of the display 214, and constructively interfere at the front 218 and/or rear 219 of the display 214 so to enhance the security of the apparatus.

In some embodiments the frequency range of the acoustic signals generated by the display elements 214 can be suitable to generate sounds in the ultrasonic range. In some embodiments the frequency range of the acoustic signals for at least one of the display elements 214 is in the ultrasonic range, whilst one or more other sections can be configured to generate sounds in the audible range. In such embodiments the audible wave may be configured to modulate the ultrasonic wave so to increase the directionality of the radiated sound. The method is effective in embodiments as ultrasound has a wavelength of only a few millimetres, which is far smaller than the size of the source (in this case, the display element segment) which results in the ultrasound waves travelling as an extremely narrow beam. When the ultrasonic wave acts as a carrier wave for the audible wave, the non-linear interaction of ultrasound in air can be used to produce a highly directional audible sound.

In some embodiments, an electret membrane can be employed as the speaker diaphragm. With respect to FIG. 4 a schematic sectional view of an exemplary embodiment using an electret membrane for the speaker diaphragm, and arranged as a monopole implementation is shown. The apparatus 400 comprises a display panel 410 and a speaker module 430. The display panel 410 can in some embodiments be a touch sensitive multi-layer arrangement comprising a display layer 434 which is the operative layer from which visual images are presented to a user, and a touch sensor layer. In some embodiments the display panel 410 can further comprise a haptic transducer layer configured to provide tactile feedback to a user when the user touches the stationary part 410. In some embodiments the display panel 410 comprises a protective layer 438 which forms the outward-most surface of the display panel 410. In some embodiments the display panel 410 comprises a conductive layer configured to form a first electrode 434 for the speaker module 430. The conductive layer forming the first electrode 434 can in some embodiments be a conductive coating over the display pannel touch layer and the protective layer 438 can comprise a thin film coating over the conductive layer.

The diaphragm 432 of the speaker module 430 is configured to be disposed between the first electrode 434 and the second electrode 436. In some embodiments, the second electrode 436 can be located away from the rear housing surface 460 of a cavity 480 in which the apparatus 400 is disposed so as to define the cavity 480. In such embodiments sound from the rear of the diaphragm 432 is directed toward the cavity 480, whereas sound from the forward direction of the diaphragm 432 is directed outside the device through the at least one aperture 420 that penetrates the display panel 410. The resulting acoustic response is not specifically shown but will form a monopole pattern centred on the display panel side of the diaphragm 432. In some other embodiments there is no cavity 480, or is not airtight. In the embodiments where there is no cavity or an acoustically transparent cavity the acoustic response can be less well defined as a monopole than where the cavity 480 were acoustically ideal.

The at least one aperture 420 can be configured in some embodiments to penetrate at least through the display layer, but can also penetrate the first electrode 434, the haptic transducer layer, the touch sensor layer and the protective coating layer 438. In other embodiments one or more of these layers need not be penetrated by the at least one aperture 420. For example the at least one aperture 420 can stop before the protective coating layer 438 in some embodiments since the protective coating layer can be configured to be acoustically transparent (or nearly so) without the requirement of holes or apertures. In some embodiments the at least one aperture 420 can have a diameter about 0.05 mm. Furthermore the apertures can be arranged in any suitable spatial configuration.

Figure 4:
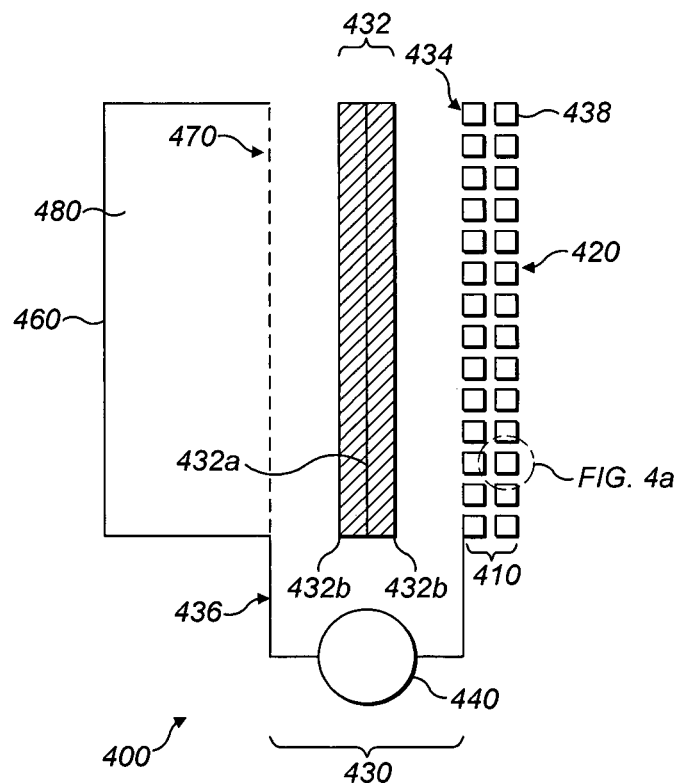
FIG. 4 shows schematically a cross-sectional view of the apparatus shown in FIG. 2 at the dashed line denoted "A" according to an alternative embodiment of the application.
Figure 4A:
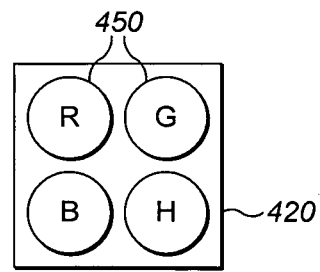
FIG. 4a shows schematically a detail of the apparatus shown in FIG. 4.

The inset shown at FIG. 4A illustrates a frontal view of a small portion of the display panel 410 from the perspective of a user facing the apparatus. As shown In some embodiments the display panel comprises a display layer formed from a matrix of pixels in which each pixel is an inorganic light emitting diode 450 each light emitting diode 450 defining an individual colour (red R, green G and blue B are shown in FIG. 4A but additional colours can be present in some other embodiments). In some other exemplary embodiments the display layer can embody other thin and flexible display technologies, such as organic LEDs as well as recent nanotechnology-related display technologies such as by example electro-chromic, electro-phoretic, electro-wetting and other technologies.

In some embodiments disposed between the individual light emitting diodes 450 forming the displayed pixels are the at least one aperture 420 (denoted H for acoustic hole as shown in FIG. 4A). In some embodiments the aperture distribution is arranged across the entire area of the display panel 410. In some embodiments the aperture distribution is irregular and in some embodiments randomized across the face of the display panel 410. In some embodiments of the application, such as shown in FIG. 4, the diameter of the small apertures 420 and their population density is selected in such a way that the apertures fit into spaces between active pixels on the display 410 and give uniform coverage, on average, across the face of the display panel.

As discussed the aperture 420 penetrating the display panel 410 can be prone to trapping contaminants such as dust and dirt, (though typically moisture is not an issue because the aperture 420 may be formed small enough that the surface tension of water prevents droplets from entering). In some embodiments Nanotechnology solution can be employed to enable at least one layer of the display panel 410 can comprise a "self-cleaning" material layer configured to repel dirt or other contaminants.

The speaker module 430 in some embodiments comprises a diaphragm 432 disposed between the first electrode 434 and a rear or second electrode 436. As shown in the embodiment shown in FIG. 4 the apertures 420 extend in the horizontal direction which is generally perpendicular to the diaphragm 432 and to the layers of the graphical display panel 410 which lies parallel to the diaphragm. The second electrode 436 is as shown in FIG. 4 disposed along a housing of the device in which the apparatus 400 is disposed. A rear housing surface 460 is also illustrated in FIG. 4 and the rear electrode 436 is disposed along or near the rear of the housing, with an appropriate insulating layer or free space therebetween so that a user's hand at that location of the rear housing does not influence the voltage or potential 440 across the electrodes 434, 436.

The speaker module 430 illustrated in FIG. 4 is a push-pull electret transducer. Push pull electret speakers are implemented in some embodiments as a transducer in which a specially treated foil electret is sandwiched between two electrodes to form a diaphragm, and arranged so that the electrodes exert forces in opposite directions on the diaphragm. Typically in such embodiments the net force applied on the diaphragm is a linear function of the applied voltage. In the example shown in FIG. 4 the electret material is integral with the diaphragm 432. As illustrated in FIG. 4 the movement of the diaphragm is 'horizontal', and parallel to the direction of the apertures 420 which are all parallel to each other through the display panel 410. The electret material at the diaphragm 432 can in some embodiments be a dielectric configured to possess a persistent electric polarization (either inherent as when the dielectric is permanently charged, or due to an externally supplied persistent polarization). In some embodiments, as shown in FIG. 4, the diaphragm 432 can comprise a conductive film 432a with a porous charge storing membrane 432b either side of the conductive film 432a. In some embodiments a permanent charge is stored in the membrane 432b. When a suitable drive voltage 440 is then applied to the electrodes 434, 436, the polarized membrane 432b is attracted to one or the other of the electrodes according to the phase of the input signal. This movement produces a sound or acoustic wave that passes through the apertures in the elecrodes 434, 436.

The free space between the diaphragm 432 and the display panel 410 in some embodiments can be configured to be relatively small. For example in some embodiments the free space can be sufficient to allow vibration of the diaphragm 432 over the desired frequency range (for example, the range of human hearing is generally considered to be 20 Hz to 20 kHz) without the diaphragm 432 contacting any portion of the display panel 410.

Although the specific embodiment shown in FIG. 4 shows a monopole implementation it would be understood that in some other embodiments a dipole implementation can be implemented. Furthermore speaker modules other than the electret speaker module shown can be implemented. For example in some other embodiments the speaker module 430 may be implemented as a piezo-electric speaker with similar dimensions as the electret speaker module.

In some embodiments a piezo-electric or electrodynamic speaker module can be implemented as it is more suitable for monopole implementations due to the need for a relatively large rear cavity 480, large enough to be acoustically advantageous to the resulting sound heard outside the host device. In certain embodiments the size of that acoustic rear cavity 480 may be reduced by filling it at least partially (or fully if practical) with activated carbon for adsorbing air (or some other suitable adsorbing material for this purpose).

It would be appreciated that the apparatus 400 can comprise a processor as described herein which determines any suitable user input and allows the user to control the audio output. For example in some embodiments the apparatus can determine whether the user wishes to operate the device in a private mode and control the apparatus to select the dipole pattern for greater privacy in a public space since there is little or no lateral leakage of sound, or the monopole pattern for a wider dispersion. The apparatus 400 can determine in some embodiments when the user selects an increased radiating area. Furthermore in some embodiments the apparatus can be configured to determine from which direction a sound can be beamed to the user based on a determination by the apparatus from an image such as a video (for the case in which the audio is related to the video as with videoconferencing).

In some embodiments the apparatus can comprise a plurality or array of speaker modules, each similar in structure to those individual speaker modules described herein configured in a single display panel. In some embodiments the plurality or array of speaker modules may be configured across two display panels that co-operate with one another, so each display panel may comprise one or more speaker modules. In some embodiments the apparatus can comprise a speaker module which is segmented into an array or matrix structure of parts, for example a single electret/electrostatic speaker module with partitioned electrodes. As discussed herein the speaker module can in some embodiments be controlled by a computer program software stored on a local memory operating on a processor. In such embodiments the processor can be configured to control the directional sound behaviour of the speaker module in order to generate a controllable sound beam pattern (in other words control the sound beam to be narrower or wider). The processor can in some embodiments control the speaker module automatically or upon determining user interaction and/or selection.

It would be understood that in some embodiments directional control is particularly advantageous to control the generation of realistic three-dimensional (or "wide") stereo playback options. In some embodiments, the apparatus can determine that the user has selected a privacy option and the processor implements using the speaker module an improved privacy of audio at low frequencies by controlling that little or no sound is transmitted laterally. Advantages can be seen when personalised audio volume selection and directionality selection is desirable, such as for example for video displays on aircraft as individual airline seats despite being closely spaced passengers can each hear their selected programs they're viewing without the need for headsets/earphones. Similar advantages can be seen in the use of embodiments of the application in automobile application where there are multiple monitors for passengers.

In embodiments using an electret type speaker module a speaker module can offer the technical advantage of high efficiency, low distortion, flat frequency response as well as the ability to form an array from a single speaker module by partioning the electrodes into segments or parts. Furthermore the absence of a magnet driving the diaphragm as in a traditional speaker module saves space and eliminates other issues such as interference with RF circuitry or erasing neighbouring magnetic media such as the magnetic stripe on credit cards. Furthermore although electret speaker modules typically require a relatively high drive voltage, they also operate on extremely small (less than 40 picofarad mainly capacitive load) current and power, facilitating small-space implementation such as handheld products such as mobile phones. Compact DC voltage converters suitable for generating the voltages required are commercially available.

In some further embodiments an apparatus may comprise a speaker module 500 wherein more than one electrodynamic or piezoelectric speaker modules are formed into arrays. For example by using ring speaker modules arranged into concentric ring. array configuration. An electrostatic or electret implementation of the speaker module 500 in accordance with the exemplary embodiments is shown in the schematic diagram of FIG. 5. In some embodiments as electrodynamic or piezoelectric speaker modules are not pressure transducers but velocity sources the driving voltage is varied as well as the phase in order to approximate a pressure source. An electrostatic or electret speaker module is essentially a pressure transducer where the electrostatic driving force is automatically uniform over the radiating surface, except at the rim where the membrane is clamped. Only the phase delay has to be varied in order to meet the criteria wherein a phase delay is applied that increases progressively towards the outer edges for the ring arrays. The delay has the same path length as the normal distance between each point on the diaphragm and the corresponding point on an imaginary sphere behind the diaphragm, assuming that the sphere touches the diaphragm at its centre. This delay approach in some embodiments can produce an ideal dipole directivity pattern that is almost constant at all frequencies, and an on-axis response which is very smooth and exhibits only very small ripples. Thus with an electrostatic or electret implementation the speaker module could be made very thin without any kind of back cavity.

The speaker module 500 in some embodiments can be partitioned and comprising a plurality of concentric shapes of electrode pairs having a membrane disposed between members of each electrode pair. In such embodiments each member of an electrode pair is driven by a respective bridge amplifier 550 having anti-phase outputs. Furthermore in such embodiments an input electric signal is amplified by a first bridge amplifier and applied to a centremost electrode pair, and each successive bridge amplifier is coupled to an output of a phase delay element of a plurality of serially connected phase delay elements 540 such that the input electric signal is successively delayed from the centremost electrode pair towards an electrode pair disposed at a periphery of the concentric shape of electrode pairs.

The embodiments thus provide a system and a method thereof capable of changing the weights to obtain an alternate directivity pattern or patterns. Although in the above example the speaker sound direction angle is not steerable left to right it would be understood that steering is possible in some embodiments by breaking the axial symmetry and furthermore in some embodiments "rocking"-type of motions are possible, and similar considerations can be utilized to make beam steering that is as independent as possible of frequency. This is facilitated by the use of the exemplary embodiments that yields smooth, nearly frequency independent directivity patterns.

In these embodiments, in order to control the speaker module 500, the plurality of bridge amplifiers and phase delay elements may be embodied in at least one integrated circuit chip or module. Furthermore although the parts are shown as being concentric rings, any suitable shape form can be used such as elliptical, rectangular, or square. The speaker module can also be any suitable technology as discussed herein, such as an electret, an electrostatic, an electrodynamic, or a piezoelectric speaker module. The speaker module can in some embodiments comprises a membrane containing a polarizing charge, and where in embodiments comprising the electrostatic speaker module the membrane comprises a conductive coating connected to a voltage.

In these embodiments, it should be further apparent that the speaker module is an axially symmetric partitioning of a planar radiator. In these embodiments each axially symmetric partition has an associated frequency dependent velocity magnitude and phase but with substantially uniform surface pressure in order to provide a substantially uniform radiation pattern across a wide range of acoustic frequencies. Furthermore the axially symmetric partitioning in these embodiments comprises a plurality of concentric rings of electrode pairs having a membrane disposed between members of each electrode pair, where there is at least one amplifier for driving each member of an electrode pair, and where there are a plurality of phase delay elements 540 such that an electric signal applied to each the electrode pairs is successively delayed from the centremost electrode pair towards an electrode pair disposed at a periphery of the concentric rings of electrode pairs.

In some embodiments, the arrangement can be a monopole design in which the concentric rings are mounted in an infinite baffle and have uniform velocity magnitude instead of uniform pressure but with exactly the same delay function. It is understood that the advantage of such arrangement considers the positional change of audio output when selected by the user.

By driving these ring sources with signals of controlled amplitudes and phases, a highly-focused or widely-dispersed sound field can be synthesized. The latter finds applications in speaker modules because producing a spatially omni-directional source at all frequencies would normally require a very small source size, but producing enough volume velocity from such a source is not always possible. Hence an attractive solution is to use an extended source with annular rings, which can be combined to produce an omni-directional far field pattern. However, traditional approaches assume the need to attenuate the output of the outer rings at high frequencies using lossy delay lines in order to minimize the edge effect, but what is really desired is to have constant radiated power with a uniform cosine directivity pattern. In the example but non-limiting embodiment it is shown to be best achieved by keeping the surface pressure distribution uniform and adjusting the phase.

Figure 5:
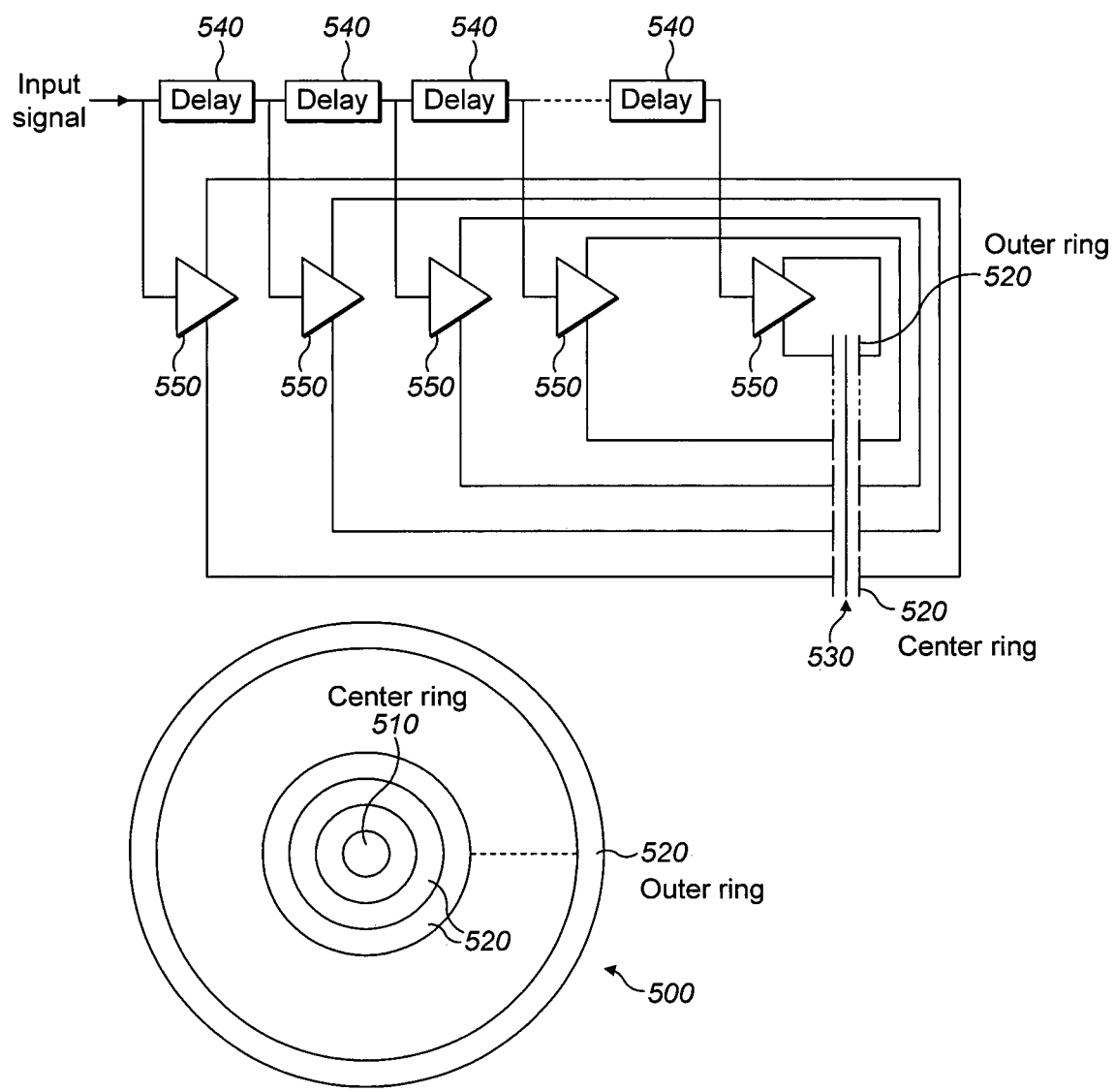
FIG. 5 shows a speaker module schematic diagram in accordance with the exemplary embodiments.

It is pointed out that the circuit topology shown in FIG. 5 is a non-limiting embodiment of circuitry that can be used. For example, in some embodiments there can be a single amplifier providing the plurality of channels. For example, conventional speaker modules in some mobile phone products currently employ class-D amplifiers with stereo outputs, where each output is individually controlled (e.g., gain and possibly also delay). This type of arrangement can be used with the speaker module 500 in FIG. 5. For example, if it is needed to amplify or control 10 different signals in some embodiments a 10-way cross-over network, having the required time delays and gains, can be located after the amplifier. It can be noted that existing conventional class D amplifiers can be bridge amplifiers with differential outputs, which is advantageous as such a system can be used when anti-phase outputs are needed to drive the electrodes 520. Otherwise the supply voltage can be doubled. Generally, the wording "switching" can be used to cover class-D, sigma-delta, pulse-width modulation or any other non-analog scheme. In general, the needed amplifiers or amplifier, and possibly related circuitry, can be integrated into a chip.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The electronic device in the preceding embodiments can comprise a processor and a storage medium, which may be electrically connected to one another by a databus. The electronic device may be a portable electronic device, such as a portable telecommunications device. The integrated display speaker module is configured to provide a user with audio and/or visual content. The vibrating speaker module may be an organic LED, inorganic LED, electrochromic, electrophoretic, or electrowetting display.

The storage medium is configured to store computer code required to operate the apparatus. The storage medium may also be configured to store the audio and/or visual content. The storage medium may be a temporary storage medium such as a volatile random access memory, or a permanent storage medium such as a hard disk drive, a flash memory, or a non-volatile random access memory. The processor is configured for general operation of the electronic device by providing signalling to, and receiving signalling from, the other device components to manage their operation. In particular, the processor is configured to control the generation of sound waves by providing audio signalling to the display module configured to radiate based on this audio signalling.

The computer program may comprise code for controlling the generation of sound waves using an apparatus, the apparatus comprising an electronic display and a display panel configured to overlie the display face of the electronic display such that the display face of the electronic display is positioned behind the display panel, the display panel configured to radiate with respect to the audio signal, radiation of the display panel configured to displace air adjacent to the plane of the electronic device to generate sound waves in the direction of the electronic display, wherein the display panel is substantially acoustically transparent and configured such that the sound waves generated by the vibrations are able to radiate through the display panel, the computer program comprising code configured to control radiation of the display panel to generate sound waves to be radiated through the display panel.

In some embodiments the controller can be configured by or be a computer program or code operating on a processor and optionally stored in a memory connected to the processor. The computer program or code can in some embodiments arrive at the speaker module via any suitable delivery mechanism. The delivery mechanism may be, for example, a computer-readable storage medium, a computer program product, a memory device such as a flash memory, a portable device such as a mobile phone, a record medium such as a CD-ROM or DVD, an article of manufacture that tangibly embodies the computer program. The delivery mechanism may be a signal configured to reliably transfer the computer program. The system may propagate or transmit the computer program as a computer data signal to other external devices such as other external speaker systems. Although the memory is mentioned as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific integration circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device.

Although embodiments of the present application have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the application believed to be of particular importance it should be understood that the Applicant claims protection in respect of any patentable feature or combination of features hereinbefore referred to and/or shown in the drawings whether or not particular emphasis has been placed thereon.

The embodiments described with reference to FIGS. 1 to 5 are particularly referred to systems employed for sound reproduction for playback operations. According to alternative embodiments, said systems may be configured by means of employing different speaker configurations for sound reproduction so that other arrangements may be achievable. For example, a speaker module can reproduce a pre-defined frequency range. In some alternative embodiments, there may be multiple speaker modules that may be used for a variety of different playback operations such as a stereo design to provide a stereo widening or a 3D audio arrangement. It is understood that such example arrangements may be further configured to provide a mono playback experience. In alternative embodiments, there may be at least two speaker modules but still operate as a mono playback.

Furthermore it should be realised that the foregoing embodiments should not be constructed as limiting. Other variations and modifications will be apparent to person skilled in the art upon reading the present application. The disclosure of the present application should be understood to include any novel features or any novel combination of features either explicitly or implicitly disclosed herein or any generalisation thereof and during the prosecution of the present application or of any application derived there from, new claims may be formulated to cover any such features and/or combination of such features.

Although it is not explicitly shown in FIGS. 1 to 5, the apparatus and system may comprise other analogue and/or digital components configured to drive the speaker module. The system thus in these embodiments may further comprise a digital signal processing (DSP) component. The system in same or other embodiments may comprise a microprocessor or processor configured to control and carry out the playback operations. In some embodiments the system can comprise a battery configured to power the electrical components, such as for example the DSP component and processor. In some embodiments the analogue and digital components configured to drive the speaker module may be in communication with the DSP component and with the microprocessor. In such embodiments the DSP and/or the microprocessor can control the analogue and digital components configured to drive the speaker module to provide driving signals to the speaker module. In other embodiments the DSP component and/or the microprocessor may adjust signals fed to the speaker module, for example by providing an at least one of: an equalizer function, a gain control, a dynamic range controller, an excessive diaphragm movement prevention control. The operation of the DSP module and/or the microprocessor can in some embodiments improve performance of audio playback. Other alternative configurations are conceivable and are within the scope of this disclosure.

It shall be appreciated that the term speaker module, system or user equipment is intended to cover any suitable type of equipment with a speaker configuration, such as mp3 players, radio receivers and transceivers, and portable data processing devices or portable web browsers with audio capabilities. Furthermore, it will be understood that the term acoustic sound channels is intended to cover sound outlets, inlets, channels and cavities, and that such sound channels may be formed integrally with the transducer and/or with the connectors, or as part of the mechanical integration of the transducer and/or the connector with the device.

As used in this application, the term 'circuitry' refers to all of the following:
(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus, comprising:
a display;
a display speaker which comprises at least one display element of the display, wherein the at least one display element is configured to generate sound waves from the display at a plurality of sound producing locations within an effective area of the display;
at least one processor; and
at least one non-transitory memory including computer program code, the at least one non-transitory memory and the computer program code configured to, with the at least one processor, cause the apparatus at least to:
determine at least one location out of the plurality of sound producing locations within the effective area of the display to produce sound while an application is operating within the apparatus, wherein the at least one location is determined based on an indication from a user interface, wherein the indication from the user interface is configured to indicate the at least one location for sound production, wherein the indication from the user interface is received while the application is operating within the apparatus;
cause display of at least one image on the display at the determined at least one location at least to indicate the produced sound is substantially coming from the determined at least one location; and
cause the display speaker to generate sound waves from the display at the determined at least one location to produce the sound, wherein, when one or more display elements of the at least one display element, corresponding to the at least one determined location, are driven, the one or more display elements are caused to generate the sound waves based on the indication.

2. The apparatus according to claim 1, wherein the at least one image is at least one of the following:
an image to represent a sound outlet for the generated sound waves; or
an image to indicate a location of the display speaker.

3. The apparatus according to claim 1, wherein the display speaker is configured to actuate the display so as to convert an electrical signal into a motion of the display.

4. The apparatus according to claim 1, wherein the display is acoustically transparent, and wherein the display comprises at least one aperture, wherein the at least one aperture is substantially invisible to the naked eye.

5. The apparatus according to claim 1, further comprising a sensor configured to receive a sensor input, and wherein the at least one non-transitory memory and the computer program code are configured to, with the at least one processor, cause the apparatus to control at least one of:
the display speaker; or
the at least one image
dependent on the generated sound waves.

6. The apparatus according to claim 5, wherein the display speaker comprises at least two segments configured to generate sound waves independently, wherein the at least one non-transitory memory and the computer program code are configured to, with the at least one processor, cause the apparatus to:
drive the at least two segments dependent on the sensor input.

7. The apparatus according to claim 6, wherein the at least one non-transitory memory and the computer program code are configured to, with the at least one processor, cause the apparatus to:
control the at least two segments to generate sound waves which interact with one another to form an interference pattern to determine the directionality and/or loudness of the generated sound waves.

8. The apparatus according to claim 1, further comprising a touch sensor configured to detect touch inputs, wherein the at least one non-transitory memory and the computer program code are configured to, with the at least one processor, cause the apparatus to control at least one of:
the display speaker; or
the at least one image
dependent on the generated sound waves.

9. The apparatus according to claim 8, wherein the display speaker comprises at least two segments, and wherein the at least one non-transitory memory and the computer program code are configured to, with the at least one processor, cause the apparatus to:
  in response to touch sensor detection of a touch input, drive the segment closest to a position of the touch input.

10. The apparatus according to claim 1, wherein the display comprises one of:
  an organic LED display;
  an inorganic LED;
  an electrochromic;
  an electrophoretic;
  a LCD display; or
  an electrowetting display.

11. The apparatus according to claim 1, wherein the display speaker is one of:
  a piezo-electric speaker;
  an electrodynamic speaker; or
  an electrostatic speaker.

12. The apparatus according to claim 1, wherein the display comprises a haptic device configured to provide tactile feedback.

13. The apparatus according to claim 1, wherein the display speaker associated with the display is disposed within one of:
  a mobile electronic device;
  an automobile dash-mount display;
  a television; or
  a personal computer of the type desktop, laptop, palmtop or tablet.

14. The apparatus of claim 1, wherein the display speaker generated sound waves originate at the display.

15. The apparatus of claim 1, wherein the at least one image overlays a main image being displayed on the display.

16. The apparatus of claim 1, wherein the at least one determined location comprises a number of the plurality of sound producing locations, wherein the number is determined based on the indication.

17. The apparatus of claim 1, wherein the indication from the user interface comprises a touch input to the display, wherein the touch input is detected at a respective location of the display corresponding to the at least one determined location.

18. The apparatus of claim 1, wherein the indication comprises a parameter for controlling the generating of the sound waves from the display at the at least one determined location.

19. A method, comprising:
  determining at least one location out of a plurality of sound producing locations within an effective area of a display to produce sound while an application is operating within an apparatus comprising a display speaker which comprises at least one display element of the display, wherein the at least one display element is configured to generate sound waves from the display at the plurality of sound producing locations, wherein the display is configured to display images;
  wherein the at least one location is determined based on an indication from a user interface, wherein the indication from the user interface is configured to indicate the at least one location for sound production, wherein the indication from the user interface is received while the application is operating within the apparatus;
  causing display of at least one image on the display at the determined at least one location at least to indicate the produced sound is substantially coming from the determined at least one location; and
  causing the display speaker to generate sound waves from the display at the determined at least one location to produce the sound, wherein, when one or more display elements of the at least one display element, corresponding to the at least one determined location, are driven, the one or more display elements are caused to generate the sound waves based on the indication.

20. The method as claimed in claim 19, further comprising determining an input to the display via a sensor; and controlling at least one of:
  the display speaker; or
  the at least one image.

21. The method as claimed in claim 19, wherein the at least one image is at least one of:
  an image to represent a sound outlet for the generated sound waves; or
  an image to indicate a location of the display speaker.

22. An apparatus comprising:
  a display;
  a display speaker which comprises at least one display element of the display, wherein the at least one display element is configured to generate sound waves from the display at a plurality of sound producing locations within an effective area of the display;
  a touch sensor configured to detect touch inputs;
  at least one processor; and
  at least one non-transitory memory including computer program code, the at least one non-transitory memory and the computer program code configured to, with the at least one processor, cause the apparatus at least to:
    determine at least one location out of the plurality of sound producing locations within the effective area of the display to produce sound while an application is operating within the apparatus, wherein the at least one location is determined based on an indication from a user interface, wherein the indication from the user interface is configured to select the at least one location for sound production;
    cause display of at least one image on the display at the determined at least one location at least to indicate the produced sound is substantially coming from the at least one determined location;
    cause the display speaker to generate sound waves from the display at the determined at least one location to produce the sound, wherein, when one or more display elements of the at least one display element, corresponding to the at least one determined location, are driven, the one or more display elements are caused to generate the sound waves based on the indication; and
    control at least one of:
      the display speaker at least through changing the at least one location of where the sound is produced to a different location in response to a detected touch input associated with the at least one image, and cause display of the at least one image at the different location; or
      the at least one image dependent on the generated sound waves.

23. An apparatus comprising:
  a display;
  a display speaker associated with the display configured to generate sound waves from the display at a plurality of sound producing locations within an effective area of the display;
  at least one processor; and at least one non-transitory memory including computer program code, the at least one non-transitory memory and the computer program code configured to, with the at least one processor, cause the apparatus at least to:
- determine at least one location out of the plurality of sound producing locations within the effective area of the display to produce sound while a phone application is operating within the apparatus, wherein the at least one location is determined in response to receiving an indication of a phone call;
- cause display of at least one image on the display at the determined at least one location at least to indicate the produced sound is substantially coming from the at least one determined location; and
- cause the display speaker to generate sound waves from the display at the determined at least one location to produce the sound.

\* \* \* \* \*